United States Patent

Norizuki et al.

[11] Patent Number: 6,154,859
[45] Date of Patent: Nov. 28, 2000

[54] ABNORMALITY MONITOR METHOD AND ABNORMALITY MONITOR SYSTEM IN A NETWORK

[75] Inventors: Akira Norizuki; Katsumi Murakami; Hiroshi Nishiyama; Katsutoshi Nakajima, all of Shizuoka, Japan

[73] Assignee: Yazaki Corporation, Tokyo, Japan

[21] Appl. No.: 09/059,593

[22] Filed: Apr. 14, 1998

[30] Foreign Application Priority Data

Apr. 15, 1997 [JP] Japan ................................. 9-097552
Mar. 27, 1998 [JP] Japan ............................... 10-082034

[51] Int. Cl.⁷ .................................................. G06F 11/00
[52] U.S. Cl. .............................................. 714/47; 714/49
[58] Field of Search ................................... 714/39, 43, 47, 714/49, 50, 4, 15, 21; 709/224, 227, 228, 232, 238, 249, 251; 370/254, 410

[56] References Cited

U.S. PATENT DOCUMENTS

| | | | |
|---|---|---|---|
| 5,542,047 | 7/1996 | Armstrong | 709/224 |
| 5,557,744 | 9/1996 | Kobayakawa et al. | 709/200 |
| 5,592,491 | 1/1997 | Dinkins | 370/277 |
| 5,835,721 | 11/1998 | Donahue et al. | 709/224 |

FOREIGN PATENT DOCUMENTS

| | | |
|---|---|---|
| 8-65331 | 3/1996 | Japan . |
| 8-265319 | 10/1996 | Japan . |
| 8-307321 | 11/1996 | Japan . |

*Primary Examiner*—Robert W. Beausoliel, Jr.
*Assistant Examiner*—Pierre E. Elisca
*Attorney, Agent, or Firm*—Morgan, Lewis & Bockius LLP

[57] ABSTRACT

In an abnormality monitor system of a network, when it is determined that a data transmission function is impaired as a data transmission line is broken or an abnormality occurs in a communication IC, a CPU sends abnormality occurrence information indicating abnormality occurrence and the abnormality occurrence point from a slave station unit to a master station unit through a communication line provided separately from the data transmission line.

18 Claims, 3 Drawing Sheets

ABNORMALITY MONITOR METHOD AND ABNORMALITY MONITOR SYSTEM IN A NETWORK

BACKGROUND OF THE INVENTION

This invention relates to a network comprising a plurality of station units connected by a ring-like data transmission line enabling circular transmission of communication data in digital form and adopting a master slave method as a communication method, and in particular to an abnormality monitor method and an abnormality monitor system in a network capable of maintaining a network management function in a master station unit in the normal state even if a communication function in the network is impaired because of a broken line of a data transmission line, an abnormality in communication means for governing reception and transmission of communication data, or the like.

Hitherto, a network generally has been known which comprises a plurality of station units connected by a ring-like data transmission line enabling circular transmission of communication data in digital form.

To exchange communication data between station units in a network configured as described above, first a communication IC for governing reception and transmission of communication data is provided for each station unit and the communication the transmitting party in a predetermined direction on a data transmission line. The communication IC in the station unit downstream from the transmitting party on the data transmission line determines whether or not an address of its own station unit is specified as a destination. If the address of its own station unit is not specified as the destination, the communication IC sends the communication data to the station unit downstream from its own station unit through the data transmission line. On the other hand, if the address of its own station unit is specified as the destination, the communication IC reads the communication data through the data transmission line, thereby exchanging the communication data between the station units.

Of the networks configured as described above, hitherto a network adopting a master slave method as a communication method has also been known. This network consists of one master station unit operating as a master and other slave station units operating as a slave.

In the network adopting the master slave method, the master station unit performs operation management of all station units making up the network and maintains the network communication function in the normal state as a network maintaining function, and each slave station unit usually stands by in a reception wait state and upon reception of communication data containing control information for each slave station unit such as transmission start or reception start sent from the master station unit, the slave station unit suitably receives or transmits communication data including source data containing voice or video information and control data containing slave station unit control information.

However, according to the conventional network adopting the master slave method as the communication system, if a broken line of the data transmission line occurs or an abnormal condition such as a failure occurs in a communication IC in a station unit at a midpoint position on the route between the transmitting party and the destination, the communication data cannot be transmitted to station units downstream from the broken data transmission line or the station unit falling into the abnormal condition, thus the master station unit cannot keep track of the abnormality occurrence point in the network. Resultantly, a problem of interfering with the network management function of the master station unit, which should be solved, is contained in the prior art.

SUMMARY OF THE INVENTION

It is therefore an object of the invention to provide an abnormality monitor method in a network which can maintain a network management function in a master station unit in the normal state by sending abnormality occurrence information indicting abnormality occurrence and the abnormality occurrence point from a slave station unit to a master station unit through a communication lien provided separately from a data transmission line even if the data transmission line is broken or communication means for governing reception and transmission of communication data fails into an abnormal condition.

It is another object of the invention to provide a network abnormality monitor system that can maintain the network management function of a master station unit in the normal state.

In order to solve the above problems, according to a first aspect of the invention, a network abnormality monitor method in a network comprising a plurality of station units connected by a main data transmission line like a ring enabling circular transmission of communication data in digital form and adopting a master slave method as a communication method, wherein said plurality of station units are comprised of one master station unit operating as a master and slave station units operating as slaves wherein said network comprises one or more sub data transmission lines being provided separately from the main data transmission line for connecting said station units, and wherein each of said station units carry out the steps of: executing monitor processing of monitoring a communication state in said network; executing abnormally determination processing of determining whether or not the network communication state is abnormal upon reception of the monitor processing result; and when it is determined that the network communication state is abnormal as a result of the abnormality determination processing, executing abnormality occurrence notification processing of sending abnormality occurrence information indicating abnormality occurrence and the abnormality occurrence point to said master station unit through the sub data transmission line.

According to the first aspect of the invention, each of the station units executes monitor processing of monitoring the communication state in the network, executes abnormality determination processing of determining whether or not the network communication state is abnormal upon reception of the monitor processing result, and when it is determined that the network communication state is abnormal as a result of the abnormality determination processing, executes abnormality occurrence notification processing of sending abnormality occurrence information indicating abnormality occurrence and the abnormality occurrence point to the master station unit through the sub data transmission line provided separately from the main data transmission line. Therefore, the network management function of the master station unit can be maintained in the normal state.

Moreover, according to the first aspect of the invention, the master station unit can keep track of the abnormality occurrence information indicating abnormality occurrence and the abnormality occurrence point, thus when the network falls into an abnormal condition, maintenance of the network can be easily accomplished.

According to a second aspect of the invention, a network abnormality monitor method in a network comprising a plurality of station units connected by a data transmission line like a ring enabling circular transmission of communication data in digital form and adopting a master slave method as a communication method, wherein said plurality of station units are comprised of one master station unit operating as a master and slave station units operating of slaves, wherein said network comprises one or more sub data transmission lines being provided separately from the data transmission line for connecting said master station unit and said slave station units is a one-to-one correspondence, and wherein each of said station units carry out the steps of: executing monitor processing of monitoring a communication state in said network; executing abnormality determination processing of determining whether or not the network communication state is abnormal upon reception of the monitor processing result; and when it is determined that the network communication state is abnormal as a result of the abnormality determination processing, executing abnormality occurrence notification processing of sending abnormality occurrence information indicating abnormality occurrence and the abnormality occurrence point to said master station unit through the sub data transmission line.

According to the second aspect of the invention, each of said station units executes monitor processing of monitoring a communication state in said network, executes abnormality determination processing of determining whether or not the network communication state is abnormal upon reception of the monitor processing result, and when it is determined that the network communication state is abnormal as a result of the abnormality determination processing, executes abnormality occurrence notification processing of sending abnormality occurrence information indicating abnormality occurrence and the abnormality occurrence point to said master station unit through the sub data transmission line. Therefore, the network management function of the master station unit can be maintained in the normal size.

Moreover, according to the second aspect of the invention, the master station unit can keep track of the abnormality occurrence information indicating abnormality occurrence and the abnormality occurrence point, thus when the network falls into an abnormal condition, maintenance of the network can be easily accomplished.

According to a third aspect of the invention, in the network abnormality monitor method, considering a capability of sending the abnormality occurrence information, an information transmission medium of a low transmission capacity as compared with the main data transmission line is used as the sub data transmission line.

According to a fourth aspect of the invention, in the network abnormality monitor method, the information transmission medium is a wake-up signal line which is configured to connect said master station unit to each of said slave station units in a one-to-one correspondence and is used when a wake-up signal as a network initialization command of each slave station unit is transmitted from the master station unit to each slave station unit.

According to a fifth aspect of the invention, in the network abnormality monitor method, the information transmission medium is a power line used to supply power to each station unit.

According to the fifth aspect of the invention, the power line previously installed in the network is applied as the information transmission medium. Therefore, the network abnormality monitor method that can maintain the network management function of the master station unit in the normal state can be realized without additionally installing a new sub data transmission line.

According to a sixth aspect of the invention, in the network abnormality monitor method, the information transmission medium is an analog signal line which is configured to connect said station units to each other and is used when analog communication data is exchange between each of the station units.

According to the sixth aspect of the invention, the analog signal line previously installed in the network is applied as the information transmission medium. Therefore, the network abnormality monitor method that can maintain the network management function of the master station unit in the normal state can be realized without additionally installing a new sub data transmission line.

According to a seventh aspect of the invention, in the network abnormality monitor method, the information transmission medium is an analog signal line which is configured to connect said master station unit to each of said slave station units in a one-to-one correspondence and is used when they exchange analog communication data with each other.

According to the seventh aspect of the invention, the analog signal line previously installed in the network is applied as the information transmission medium. Therefore, the network abnormality monitor method that can maintain the network management function of the master station unit in the normal state can be realized without additionally installing a new sub data transmission line.

According to an eighth aspect of the invention, in the network abnormality monitor method, the monitor processing step includes determining whether or not the reception state of communication data received from any other station unit then its own station unit is abnormal or whether or not communication data transmitted by its own station unit arrives at the destination, and wherein the abnormality determination processing step includes determining that the network communication state is abnormal when the communication data reception state is abnormal or the communication data does not arrive at the destination, upon reception of the monitor processing result.

According to the eight aspect of the invention, the monitor processing step includes determining whether or not the reception state of communication data received from any other station unit than its own station unit is abnormal or whether or not communication data transmitted by its own station unit arrives at the destination, and the abnormality determination processing step includes determining that the network communication state is abnormal when the communication data reception state is abnormal or the communication data does not arrive at the destination, upon reception of the monitor processing result. Therefore, the network communication state and the abnormality occurrence point can be grasped extremely accurately.

According to a ninth aspect of the invention, in the network abnormality monitor method, the monitor processing step includes assuming that the communication data transmitted by its own station unit does not arrive at the destination when communication data indicating reception of the communication data is not returned from the destination of the communication data transmitted by its own station unit.

According to the ninth aspect of the invention, when communication data indicating reception of the communication data is not returned from the destination of the communication data transmitted by its own station unit, it is assumed that the communication data transmitted by its own station unit does not arrive at the destination. Therefore, the network communication state and the abnormality occurrence point can be grasped extremely accurately.

According to a tenth aspect of the invention, a network abnormality monitor system in a network comprising a plurality of station units connected by a main data transmission line like a ring enabling circular transmission of communication data in digital form and adopting a master slave method as a communication method, wherein said plurality of station units is comprised of one master station unit operating as a master and slave station units operating as slaves, wherein said network comprises one or more sub data transmission lines being provided separately from the main data transmission line for connecting said station units, and wherein each of said station units comprises: monitor means for executing monitor processing of monitoring a communication state in side network; abnormality determination means for executing abnormality determination processing of determining whether or not the network communication state is abnormal upon reception of the monitor processing result of said monitor means; and abnormality occurrence notification means for executing abnormality occurrence notification processing of sending abnormality occurrence information indicating abnormality occurrence and the abnormality occurrence point to said master station unit through the sub data transmission line when it is determined that the network communication state is abnormal as a result of the abnormality determination processing of said abnormality determination means.

According to the tenth aspect of the invention, in each of the station units, first the monitor means executes monitor processing of monitoring the communication state in the network. The abnormality determination means executes abnormality determination processing of determining whether or not the network communication state is abnormal upon reception of the monitor processing result of the monitor means. When it is determined that the network communication state is abnormal as a result of the abnormality determination processing of the abnormality determination means, the abnormality occurrence notification means executes abnormality occurrence notification processing of sending the abnormality occurrence information indicating abnormality occurrence and the abnormality occurrence point to the master station unit through the sub data transmission line provided separately from the main data transmission line. Therefore, the network management function of the master station unit can be maintained in the normal state.

Moreover, according to the tenth aspect of the invention, the master station unit can keep track of the abnormality occurrence information indicating abnormality occurrence and the abnormality occurrence point, thus when the network falls into an abnormal condition, maintenance of the network can be easily accomplished.

According an eleventh aspect of the invention, a network abnormality monitor system in a network comprising a plurality of station units connected by a data transmission line like a ring enabling circular transmission of communication data in digital form and adopting a master slave method as a communication method, wherein said plurality of station units are comprised of one master station unit operating as a master and slave station units operating as slaves, wherein said network comprises one or more sub data transmission lines being provided separately from the data transmission line for connecting said master station unit and said slave station units in a one-to-one correspondence, and wherein each of said station units comprises: monitor means for executing monitor processing of monitoring a communication state in said network; abnormality determination means for executing abnormality determination processing of determining whether or not the network communication state is abnormal upon reception of the monitor processing result of said monitor means; and abnormality occurrence notification means for executing abnormality occurrence notification processing of sending abnormality occurrence information indicating abnormality occurrence end the abnormality occurrence point to said master station unit through the sub data transmission line when it is determined that the network communication state is abnormal as a result of the abnormality determination processing of said abnormality determination means.

According the eleventh aspect of the invention, in each of the station units, first the monitor means executes monitor processing of monitoring the communication state in the network. The abnormality determination means executes abnormality determination processing of determining whether or not the network communication state is abnormal upon reception of the monitor processing result of the monitor means. When it is determined that the network communication state is abnormal as a result of the abnormality determination processing of the abnormality determination means, the abnormality occurrence notification means executes abnormality occurrence notification processing of sending the abnormality occurrence information indicating abnormality occurrence and the abnormality occurrence point to the master station unit through the sub data transmission line provided separately from the main data transmission line. Therefore, the network management function of the master station unit can be maintained in the normal state.

Moreover, according to the eleventh aspect of the invention, the master station unit can keep track of the abnormality occurrence information indicating abnormality occurrence and the abnormality occurrence point, thus when the network falls into an abnormal condition, maintenance of the network can be easily accomplished.

According to a twelfth aspect of the invention, in the network abnormality monitor system, considering a capability of sending the abnormality occurrence information, an information transmission medium of a low transmission capacity as compared with the main data transmission line is used as the sub data transmission line.

According to a thirteenth aspect of the invention, is the network abnormality monitor system, the information transmission medium is a wake-up signal line which is configured to connect said master station unit to each of said slave station units in a one-to-one correspondence and is used when a wake-up signal as a network initialization command of each slave station unit is transmitted from the master station unit to each slave station unit.

According to the thirteenth aspect of the invention, the wake-up signal line previously installed in the network is applied as the information transmission medium. Therefore, the network abnormality monitor system that can maintain the network management function of the master station unit in the normal state can be provided without additionally installing a new sub data transmission line.

According to the fourteenth aspect of the invention, in the network abnormality monitor system, the information transmission medium is a power line used to supply power to each station unit.

According to the fourteenth aspect of the invention, the power line previously installed in the network is applied as the information transmission medium. Therefore, the network abnormality monitor system that can maintain the network management function of the master station unit in the normal state can be provided without additionally installing a new sub data transmission line.

According to a fifteenth aspect of the invention, in the network abnormality monitor system, the information transmission medium is an analog signal line which is configured to connect said station units to each other and is used when analog communication data is exchanged between each of the station units.

According to the fifteenth aspect of the invention, the analog signal line previously installed in the network is applied as the information transmission medium. Therefore, the network abnormality monitor system that can maintain the network management function of the master station unit in the normal state can be provided without additionally installing a new sub data transmission line.

According to a sixteenth aspect of the invention, the analog signal line previously installed in the network is applied as the information transmission medium. Therefore, the network abnormality monitor system that can maintain the network management function of the master station unit in the normal state can be provided without additionally installing a new sub data transmission line.

According to a seventeenth aspect of the invention, in the network abnormality monitor system, the monitor processing of said monitor means includes determining whether or not the reception state of communication data received from any other station unit than its own station unit is abnormal or whether or not communication data transmitted by its own station unit arrives at the destination, and wherein the abnormality determination processing of said abnormality determination means includes determining that the network communication state is abnormal when the communication data reception state is abnormal or the communication data does not arrive at the destination, upon reception of the monitor processing result of said monitor means.

According to the seventeenth aspect of the invention, the monitor processing of said monitor means includes determining whether or not the reception state of communication data received from any other station unit than its own station unit is abnormal or whether or not communication data transmitted by its own station unit arrives at the destination, and wherein the abnormality determination processing of said abnormality determination means includes determining that the network communication state is abnormal when the communication data reception state is abnormal or the communication data does not arrive at the destination, upon reception of the monitor processing result of said monitor means. Therefore, the network communication state and the abnormality occurrence point can be grasped extremely accurately.

According to an eighteenth aspect of the invention, in the network abnormality monitor system, the monitor processing of said monitor means includes assuming that the communication data transmitted by its own station unit does not arrive at the destination when communication data indicating reception of the communication data is not returned to its own station unit from the destination of the communication data transmitted by its own station unit.

According to the eighteenth aspect of the invention, the monitor processing of said monitor means includes assuming that the communication data transmitted by its own station unit does not arrive at the destination when communication data indicating reception of the communication data is not returned to its own station unit from the destination of the communication data transmitted by its own station unit. Therefore, the network communication sate and the abnormality occurrence point can be grasped extremely accurately.

DETAILED DESCRIPTION OF THE INVENTION

Preferred embodiment of an abnormality monitor system in a network according to the invention will be described in detail with reference to the accompanying drawings.

Figure 1:
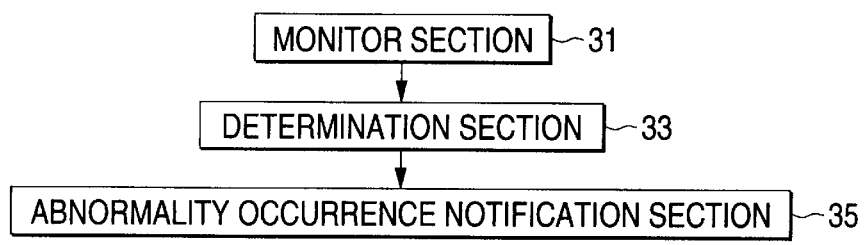
FIG. 1 is a schematic block diagram of the main part of an abnormality monitor system of a network according to a first embodiment of the invention.
Figure 2:
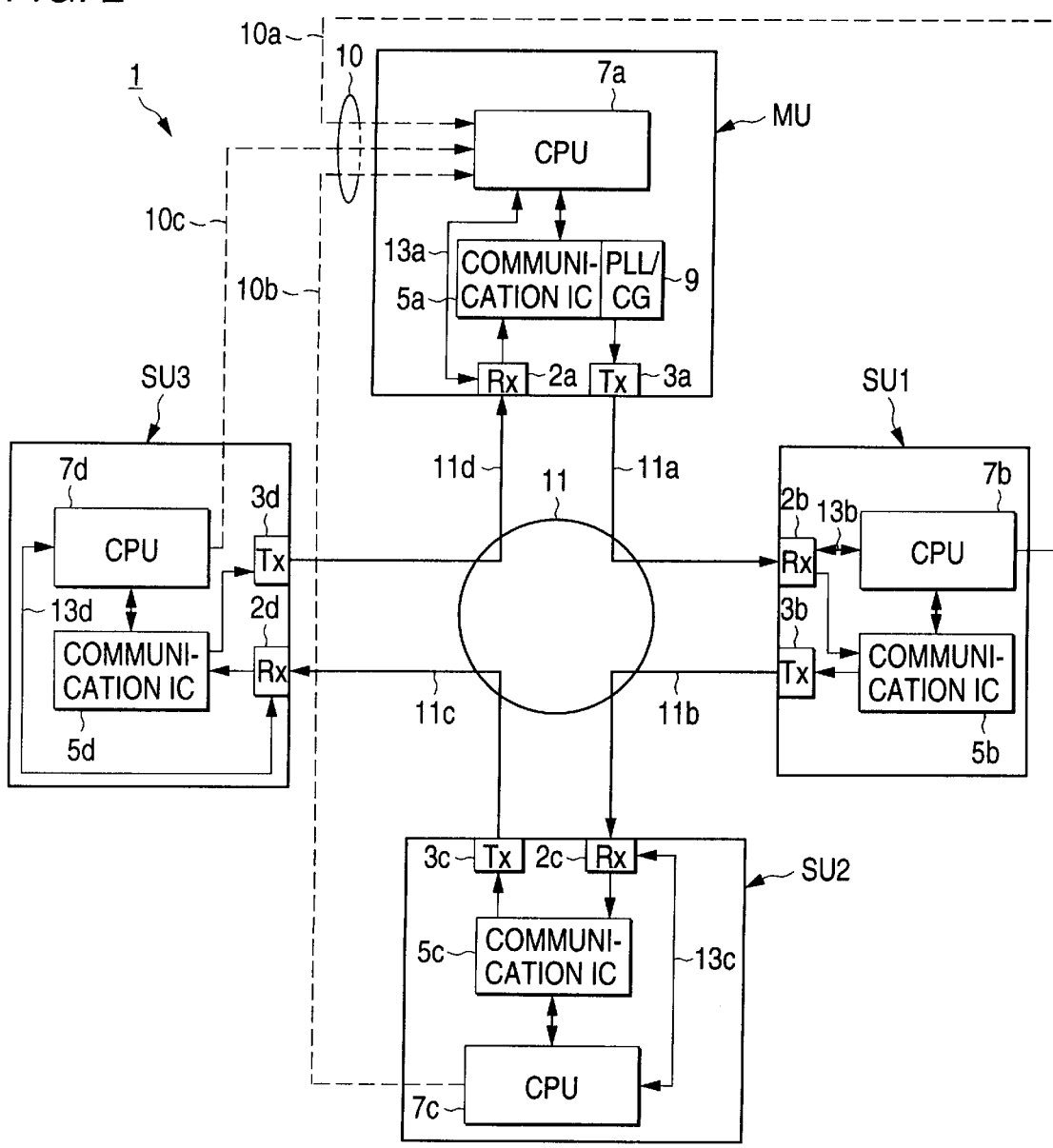
FIG. 2 is a schematic block diagram of the abnormality monitor system according to the first embodiment of the invention.
Figure 3:
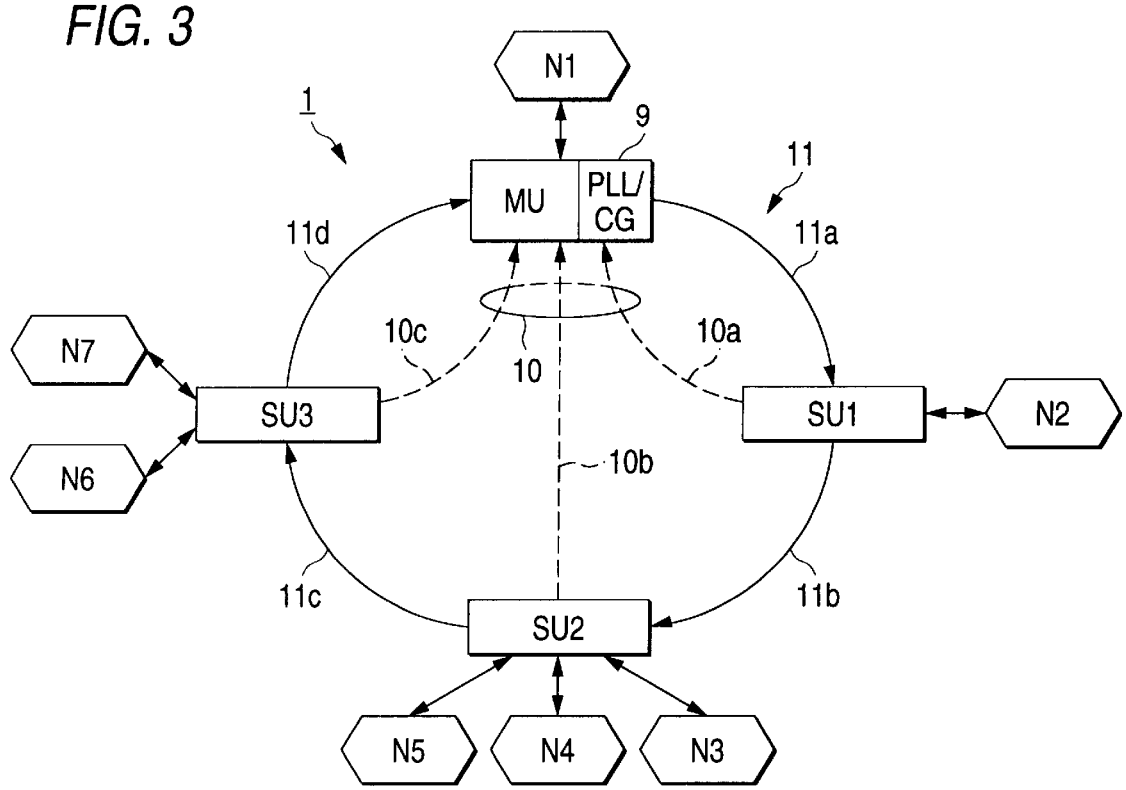
FIG. 3 is an entire structural diagram of the abnormality monitor system according to the first embodiment of the invention.
Figure 4:
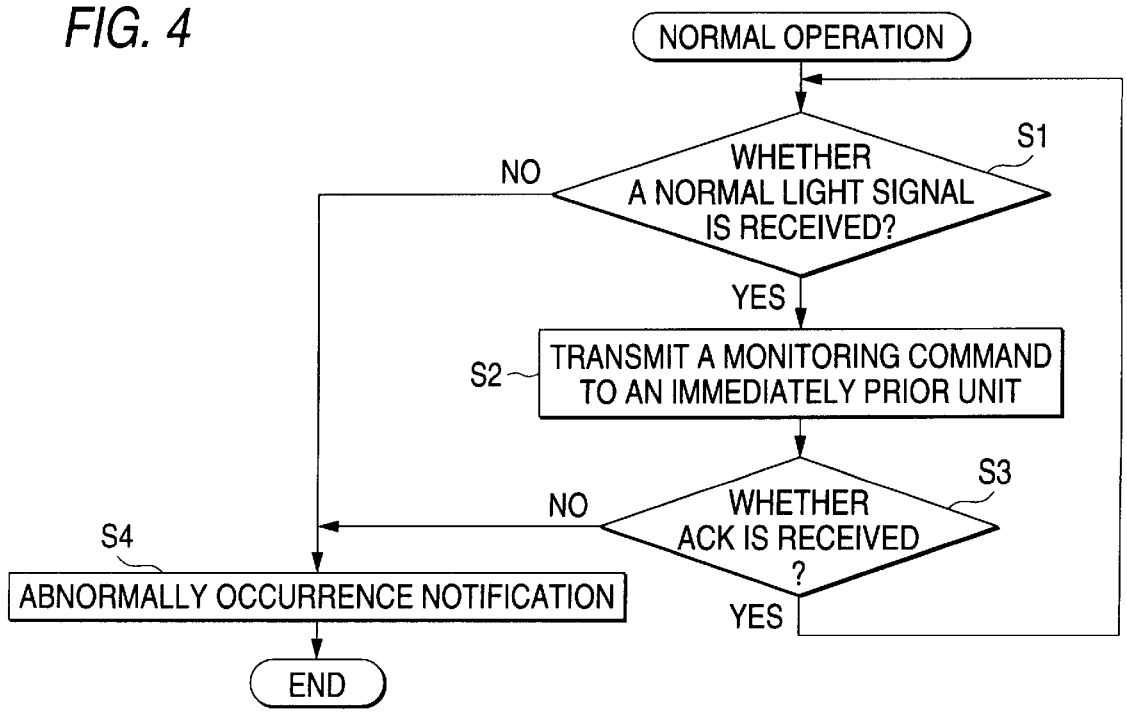
FIG. 4 is a flowchart of the operation of the abnormality monitor system according to the first embodiment of the invention.
Figure 5:
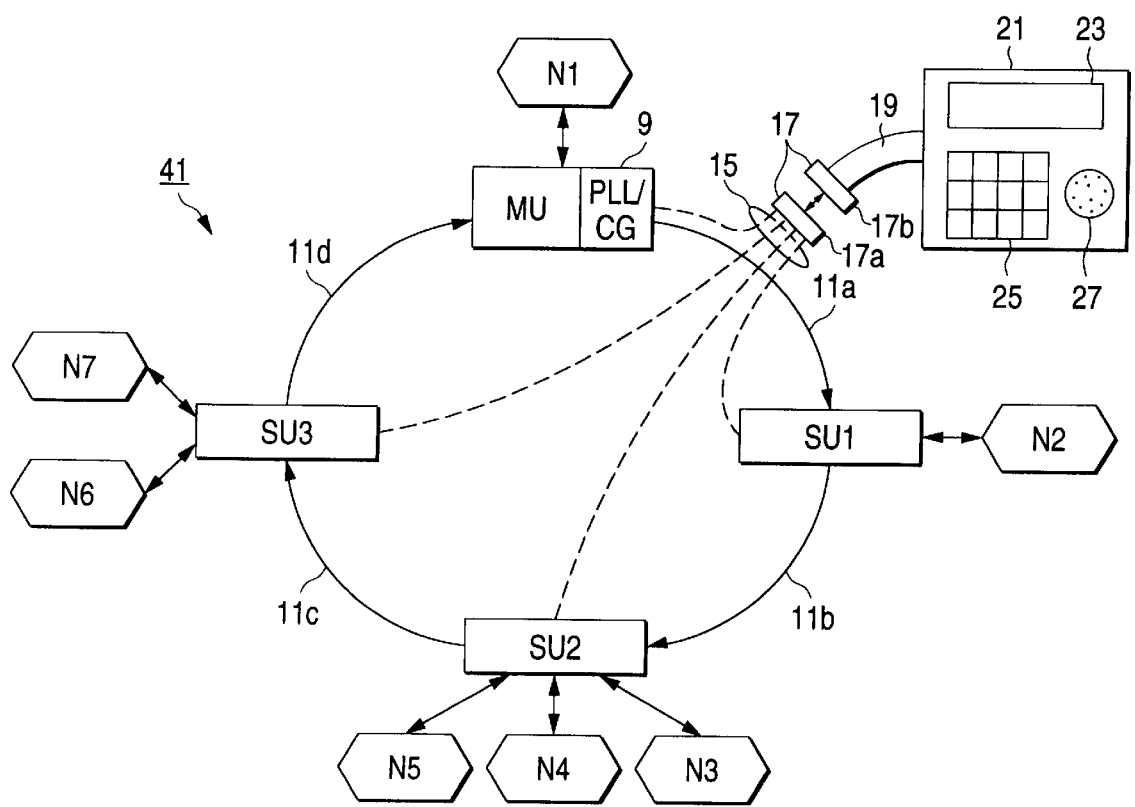
FIG. 5 is an entire structural diagram of an abnormality monitor system according to a second embodiment of the invention.

FIG. 1 is a schematic block diagram to show the main part of a network abnormality monitor system according to a first embodiment of the invention. FIG. 2 is a schematic block diagram of an abnormality monitor system according to the first embodiment of the invention. FIG. 3 is an entire structural diagram of the abnormality monitor system according to the first embodiment of the invention. FIG. 4 is a flowchart of the operation of the abnormality monitor system according to the first embodiment of he invention. FIG. 5 is an entire structural block diagram of the abnormality monitor system according to a second embodiment of the invention. The first and second embodiments in which the invention is applied to a network for connecting various machines disposed in the room of a vehicle will be discussed.

First, the entire configuration of an abnormality monitor system according to the first embodiment of the invention will be discussed with reference to FIG. 3. An abnormality monitor system 1 is applied to a network which comprises a plurality of station units connected by a main data transmission line 11 exhibiting ring-like topology enabling transmission of digital data in a single direction or both directions, wherein digital data is transferred from a transmitting station unit to a receiving station unit through the main data transmission line 11, whereby the station units can exchange the data with each other. The abnormality monitor system 1 can monitor the network communication state, etc.

An appropriate information transmission medium, such as a plastic optical fiber or electric wire, can be adopted as the main data transmission line 11. The embodiment adopts a plastic optical fiber as the main data transmission line 11 and circulates digital data clockwise for transmission.

A master slave method is adopted as a communication method among the station units in the network, wherein one of the station units operates as a master station unit MU and other units operate as slave station units SUs. That is, each slave station unit SU usually stands by in a reception wait state, and when the slave station unit receives communication data containing a command such as transmission start or reception start from the master station unit MU, the slave station unit receives or transmits communication data in response to the received data.

The master station unit MU and each of slave station units SUs are connected in a one-to-one correspondence by a sub data transmission line 10 separate from the main data transmission line 11. Alternatively, the station units can also be connected by a sub data transmission line 10 separate from the main data transmission line 11. In this case, for example, a ring-like sub data transmission line 10 like the main data transmission line 11 can also be adopted.

When one of the slave station units SUs senses that an abnormality occurs in the network, the sub data transmission line 10 corresponding to the slave station unit SU is used to send abnormality occurrence information indicating abnormality occurrence and the abnormality occurrence point to the master station unit MU separately.

Considering the capability of sending the abnormality occurrence information, an information transmission medium such as electric wire of a low transmission capacity as compared with the main data transmission line 11 can be adopted appropriately as the sub data transmission line 10.

A wake-up signal line which is configured to connect the master station unit MU to each of slave station units SUs in a one-to-one correspondence and is used when a wake-up signal as a network initialization command of each slave station unit is transmitted from the master station unit MU to each slave station unit, can be applied as the information transmission medium.

A power line used to supply power to each station unit can also be applied as the information transmission medium.

An analog signal line which is configured to connect the station units to each other and is used when analog communication data is exchanged between each of the station units, can also be applied as the information transmission medium. Video information, voice information, etc., can be cited as the analog communication data.

An analog signal line which is configured to connect the master station unit MU to each of slave station units SUs in a one-to-one correspondence and is used when analog communication data is exchanged with each other, can also be applied as the information transmission medium.

In any case, an already installed line in the network is applied as the information transmission medium. Therefore, a network abnormality monitor system that can maintain the network management function of the master station unit MU in the normal state can be provided without additionally installing a new sub data transmission line 10.

A suitable machine N1, such as a CD (compact disc) changer, an audio amplifier, a DVD (digital video disc) unit, a radio receiver, a portable telephone, a navigation system, or a digital television is connected to the master station unit MU. More than one machine can also be connected to the master station unit MU.

The master station MU contains a phase lock loop/clock generator (PLL/CG) 9 having the capabilities of generating a reference clock such as a system clock SYCLK used as the operation timing of the whole network system and maintaining the phase of the generated reference clock with high accuracy. The master station unit has the capabilities of inputting various places of data including source data such as digital audio data or digital video data, machine control data, etc., sent from the machine N1, adding header information containing the transmitting party and destination to the various pieces of data and the system clock SYCLK supplied from the phase lock loop/clock generator (PLL/CG) 9 to produce a packet, performing modulation for the packet data, and sending the modulated packet data to the data transmission line 11. In addition, the master station unit MU has the capabilities of inputting various pieces of data sent from each of the slave station units SUs, performing demodulation for the various pieces of data, and selectively sending the demodulated data to the machine N1. It also has a network management function of maintaining and managing the whole network in the normal state.

One or more machines N2 to N7 are connected to each of the slave station units SU1, SU2, and SU3. Each slave station unit SU has the capabilities of inputting packet data sent from the master station MU or any other slave station unit SU, performing demodulation for the input packet data, selectively distributing various pieces of data to the machines N2–N7 in synchronization with the system clock SYCLK, etc. gotten from the demodulated data, inputting various pieces of data sent from the machines N2 and N7, adding header information to the various pieces of data to produce a packet, performing modulation for the packet data, and sending the modulated packet data to the data transmission line 11.

Next, the slave station units SUs and the master station unit MU making up the abnormality monitor system 1 will be discussed separately with reference to FIGS. 1 and 2. The members of the slave station units SUs and the master station unit MU having identical or similar functions are denoted by the same reference numerals, and the overlapped description will be omitted. Since the slave station units SU1, SU2, and SU3 have the same internal configuration, the slave station units SU2 is taken as a representative example for describing the internal configuration of the slave station unit SU.

As shown in FIG. 2, the slave station unit SU2 comprises a light reception section 2c for receiving light containing various pieces of data sent in light signal form from the upstream station unit SU1 through the main data transmission line 11b, converting the received light signal into electric signal form, and sending packet data containing the various pieces of data converted into the electric signal form, a communication IC 5c having the capabilities of inputting the packet data sent from the light reception section 2c, demodulating the input packet data, selectively distributing the various pieces of data to the machines N3–N5 connected to the slave station unit SU2 in synchronization data, inputting various pieces of data sent from the machines N3–N5, adding header information to the various data pieces to produce a packet, modulating the packet data, and sending the modulated packet data to the main data transmission line 11c, a light emission section 3c for converting the packet data in electric signal form sent from the communication IC 5c into light signal form and sending the packet data converted into the light signal form to the main data transmission line 11c in light blink form, and a CPU (central processing unit) 7c having the capabilities of performing operation monitor and operation control of the communication IC 5c, etc.

The internal configuration of the CPU 7c contained in the slave station unit SU2 will be discussed in more detail with reference to FIG. 1. The CPU 7c comprises a monitor section 31 functioning as monitor means for executing monitor processing of monitoring the network communication state, an abnormality determination section 33 functioning as abnormality determination means for executing abnormality determination processing of determining whether or not the network communication state is abnormal upon reception of the monitor processing result of the monitor section 31, and an abnormality occurrence notification section 35 functioning as abnormality occurrence notification means for executing abnormality occurrence notification processing of sending abnormality occurrence information indicating abnormality occurrence and the abnormality occurrence point to the master station unit MU through the sub data transmission line 10b when the abnormality determination section 33 determines that the network communication state is abnormal.

The CPU 7c having the configuration continuously inputs and monitors the light reception state in the light reception section 2c via a communication line 13c and when it is determined that the network communication function is impaired because an abnormality such as a broken line occurs on the main data transmission line 11 or the communication IC 5c falls into an abnormal condition, sends abnormality occurrence information indicating abnormality occurrence and the abnormality occurrence point to the master station unit MU through the sub data transmission line 10b.

On the other hand, as shown in FIG. 2, the master station unit MU comprises a light reception section 2a, a communication IC 5a having a phase lock loop/clock generator 9, a light emission section 3a, and a CPU 7a having a network managment function of manaing abnormality occurrence in the network in a centralized manner by continuously monitoring the sub data transmission line 10 to see if abnormality occurrence notification is sent from each slave station unit SU, in addition to the function of the CPU 7c contained in the slave station unit SU2.

When the abnormality occurrence information is sent from the slave station unit SU1 via the sub data transmision line 10a to the master station unit MU, a direct communication method between the CPUs contained in the units is adopted. Thus, even if the communication IC 5b, for example, falls into a communication-impossible state, the master station unit MU can be reliably notified of the event.

Next, the operation of the abnormality monitor system in the network according to the invention will be discussed with reference to FIG. 4.

First, at step S1, the CPU 7 contained in each slave station unit SU continuously inputs and monitors the light reception state in the light reception section 2 through the communication cable 13 and determines whether or not the light reception section 2 receives a normal light signal. If the light reception section 2 receives a normal light signal as a result of the light signal reception determination at step S1, the CPU 7 instructs the communication IC 5 to transmit a monitoring command to the immediately preceding station unit at step S2. Upon reception of the monitoring command transmission instruction, the communication IC 5 adds header information specifying the address of its own station unit as the transmitting party and the address of the immediately preceding station unit as the destination to the monitoring command to be transmitted to produce a packet, performs modulation for the packet data, and sends the modulated packet data to the light emission section 3, which then converts the packet data sent from the communication IC 5 into light signal form and sends the packet data converted into the light signal form to the data transmission line 11 in light blink form. The station unit specified as the destination adds ACK (acknowledge) code indicating that the packet data has been received, to the packet data and returns the packet data with the ACK through the data transmission line 11.

Next, the CPU 7 determines whether or not the returned packet data contains ACK at step S3. If the returned packet data contains ACK as a result of the ACK reception determination at step S3, the CPU 7 returns control to step S1 and repeats the process. The steps S1 to S3 are a process flow supplied when the data transmission function in the network is maintained in the normal state.

On the other hand, a process flow applied when the data transmission function in the network is not maintained in the normal state will be discussed. If the light reception section 2 does not receive a normal light signal as a result of the light signal reception determination at step S1, the CPU 7 assumes some abnormality to have occurred in the light reception section 2, the light signal route to the light reception section 2, or any other station unit, and instructs the communication IC 5 to transmit abnormality occurrence notification to the master station unit MU through the communication line 10 provided separately from the data transmission line 11. If the packet data containing ACK is not received, namely, if normal data communication does not hold although the light signal is received, the CPU 7 assumes that the communication IC 5 in its own station unit falls into an abnormal condition, and instructs the communication IC 5 to transmit abnormality occurrence notification to the master station unit MU through the communication lien 10 at step S4. Upon reception of the abnormality occurrence notification from each slave station unit SU, the master station unit MU totally judges and keeps track of the abnormality occurrence information indicating abnormality occurrence and the abnormality occurrence point in the network, and displays the abnormality occurrence information indicating abnormality occurrence and the abnormality occurrence point on display means such as a display panel (not shown).

Thus, the abnormality monitor system of a network according to the first embodiment of the invention enables the network management function in the master station unit MU to be maintained in the normal state.

Since the master station unit MU can keep track of the abnormality occurrence information indicating abnormality occurrence and the abnormality occurrence point, the network can be maintained easily, when it falls into an abnormal condition.

Next, an abnormality monitor system 41 according to a second embodiment of the invention comprises communication lines 15 connected to a master station unit MU and slave station units SUs, a connector 17a to which ends of the communication lines 15 are centralized connected, a connector 17b fitted to the connector 17a, a flat cable 19 connected to the connector 17b, and a portable terminal 21 which is connected to the flat cable 19 and includes a display section 23 such as a liquid crystal panel for displaying abnormality occurrence information, a keyboard 25 for an operator to manually enter commands, and a loudspeaker 27 used to reproduce source data from a variety of machines N. By coupling the connectors 17a and 17b, abnormality occurrence information detected by each of the master station unit MU and the slave station units SUs making up a network can be output to the portable terminal 21 outside the network via the communication line 15, the connectors 17a and 17b, and the flat cable 19.

The portable terminal 21 enables a serviceman to execute, for example, troubleshooting of a network on board of a vehicle extremely easily as required. As a result, the abnormality monitor system having high utility can be configured.

It is to be understood that the invention is not limited to the above described specific embodiments, and many apparently widely different embodiments of the invention may be made without departing from the spirit and scope as defined in the appended claims.

As described above, according to the first or second aspect of the invention, each of the station units executes monitor processing of monitoring the communication state in the network, executes abnormality determination processing of determining whether or not the network communication state is abnormal upon reception of the monitor processing result, and when it is determined that the network communication state is abnormal as a result of the abnormality determination processing, executes abnormality occurrence notification processing of sending abnormality occurrence information indicating abnormality occurrence and the abnormality occurrence point to the master station unit through the sub data transmission line provided separately from the main data transmission line. Therefore, the network management function of the master station unit can be maintained in the normal state.

Moreover, according to the first or second aspect of the invention, the master station unit can keep track of the abnormality occurrence information indicating abnormality occurrence and the abnormality occurrence point, thus when the network falls into an abnormal condition, maintenance of the network can be easily accomplished.

According to the fourth aspect of the invention, the wake-up signal line previously installed in the network is applied as the information transmission medium. Therefore, the network abnormality monitor method that can maintain the network management function of the master station unit in the normal state can be realized without additionally installing a new sub data transmission line.

According to the fifth aspect of the invention, the power line previously installed in the network is applied as the information transmission medium. Therefore, the network abnormality monitor method that can maintain the network management function of the master station unit in the normal state can be realized without additionally installing a new sub data transmission line.

According to the sixth aspect of the invention, the analog signal line previously installed in the network is applied as the information transmission medium. Therefore, the network abnormality monitor method that can maintain the network management function of the master station unit in the normal state can be realized without additionally installing a new sub data transmission line.

According to the seventh aspect of the invention, the analog signal line previously installed in the network is applied as the information transmission medium. Therefore, the network abnormality monitor method that can maintain the network management function of the master station unit in the normal state can be realized without additionally installing a new sub data transmission line.

According to the eighth aspect of the invention, the monitor processing step includes determining whether or not the reception state of communication data received from any other station unit than its own station unit is abnormal or whether or not communication data transmitted by its own station unit arrives at the destination, and the abnormality determination processing step includes determining that the network communication state is abnormal when the communication data reception state is abnormal or the communication data does not arrive at the destination, upon reception of the monitor processing result. Therefore, the network communication state and the abnormality occurrence point can be grasped extremely accurately.

According to the ninth aspect of the invention when communication data indicating reception of the communication data is not returned from the destination of the communication data transmitted by its own station unit, it is assumed that the communication data transmitted by its own station unit does not arrive at the destination. Therefore, the network communication state and the abnormality occurrence point can be grasped extremely accurately.

According to the tenth or eleventh aspect of the invention, in each of the station units, first the monitor means executes monitor processing of monitoring the communication state in the network. The abnormality determination means executes abnormality determination processing of determining whether or not the network communication state is abnormal upon reception of the monitor processing result of the monitor means. When it is determined that the network communication state is abnormal as a result of the abnormality determination processing of the abnormality determination means, the abnormality occurrence notification means executes abnormality occurrence notification processing of sending the abnormality occurrence information indicating abnormality occurrence and the abnormality occurrence point to the master station unit through the sub data transmission line provided separately from the main data transmission line. Therefore, the network management function of the master station unit can be maintained in the normal state.

Moreover, according to the tenth or eleventh aspect of the invention, the master station unit can keep track of the abnormality occurrence information indicating abnormality occurrence and the abnormality occurrence point, thus when the network falls into an abnormal condition, maintenance of the network can be easily accomplished.

According to the thirteenth aspect of the invention, the wake-up signal line previously installed in the network is applied as the information transmission medium. Therefore, the network abnormality monitor system that can maintain the network management function of the master station unit in the normal state can be provided without additionally installing a new sub data transmission line.

According to the fourteenth aspect of the invention, the power line previously installed in the network is applied as the information transmission medium. Therefore, the network abnormally monitor system that can maintain the network management function of the master station unit in the normal state can be provided without additionally installing a new sub data transmission line.

According to the fifteenth aspect of the invention, the analog signal line previously installed in the network is applied as the information transmission medium. Therefore, the network abnormality monitor system that can maintain the network management function of the master station unit in the normal state can be provided without additionally installing a new sub data transmission line.

According to the sixteenth aspect of the invention, the analog signal line previously installed in the network is applied as the information transmission medium. Therefore, the network abnormality monitor system that can maintain the network management function of the master station unit in the normal state can be provided without additionally installing a new sub data transmission line.

According to the seventeenth aspect of the invention, the monitor processing of said monitor means includes determining whether or not the reception state of communication data received from any other station unit than its own station unit is abnormal or whether or not communication data transmitted by its own station unit arrives at the destination, and wherein the abnormality determination processing of said abnormality determination means includes determining that the network communication state is abnormal when the communication data reception state is abnormal or the communication data does not arrive at the destination, upon reception of the monitor processing result of said monitor means. Therefore, the network communication state and the abnormality occurrence point can be grasped extremely accurately.

According to the eighteenth aspect of the invention, the monitor processing of said monitor means includes assuming that the communications data transmitted by its own station unit does not arrive at the destination when communication data indicating reception of the communication data is not returned to its own station unit from the destination of the communication data transmitted by its own station unit. Therefore, the network communication state and the abnormality occurrence point can be grasped extremely accurately.

What is claimed is:

1. A network abnormality monitor method in a network comprising a plurality of station units connected by a ring-like main data transmission line enabling circular transmission of communication data in digital form and adopting a master slave method as a communication method, wherein said plurality of station units are comprised of one master station unit operating as a master and slave station units operating as slaves, wherein said network comprises at least one sub data transmission line being provided separately from the main data transmission line for connecting said station units, and wherein each of said station units perform the steps of:

executing monitor processing of monitoring a communication state in said network;

executing abnormality determination processing of determining whether or not the communication state in said network is abnormal upon reception of a monitor processing result; and when it is determined that the communication state in said network is abnormal as a result of the abnormality determination processing, executing abnormality occurrence notification processing of sending abnormality occurrence information indicating abnormality occurrence and an abnormality occurrence point to said master station unit through the sub data transmission line.

2. The network abnormality monitor method as claimed in claim 1, wherein an information transmission medium of a low transmission capacity as compared with the main data transmission line is used as the sub data transmission line.

3. The network abnormality monitor method as claimed in claim 2, wherein the information transmission medium is a wake-up signal line which connects said master station unit to each of said slave station units in a one-to-one correspondence and is used when a wake-up signal as a network initialization command of each slave station unit is transmitted from the master station unit to each slave station unit.

4. The network abnormality monitor method as claimed in claim 2, wherein the information transmission medium is a power line used to supply power to each station unit.

5. The network abnormality monitor method as claimed in claim 2, wherein the information transmission medium is an analog signal line which connects said station units to each other and is used when analog communication data is exchanged between each of said station units.

6. The network abnormality monitor method as claimed in claim 2, wherein the information transmission medium is an analog signal line which connects said master station unit to each of said slave station units in a one-to-one correspondence and is used when analog communication data is exchanged between said master station unit and each of said slave station units.

7. A network abnormality monitor method in a network comprising a plurality of station units connected by a ring-like data transmission line enabling circular transmission of communication data in digital form and adopting a master slave method as a communication method, wherein said plurality of station units are comprised of one master station unit operating as a master and slave station units operating as slaves, wherein said network comprises at least one sub data transmission line being provided separately from the data transmission line for connecting said master station unit and said slave station units in a one-to-one correspondence, and wherein each of said station units performs the steps of:

executing monitor processing of monitoring a communication state in said network;

executing abnormality determination processing of determining whether or not the communication state in said network is abnormal upon reception of a monitor processing result; and when it is determined that the communication state in said network is abnormal as a result of the abnormality determination processing, executing abnormality occurrence notification processing of sending abnormality occurrence information indicating abnormality occurrence and an abnormality occurrence point to said master station unit through the sub data transmission line.

8. The network abnormality monitor method as claimed in claim 1 or 7, wherein the monitor processing step includes determining whether or not a reception state of communication data received from any other station unit than its own station unit is abnormal or whether or not communication data transmitted by its own station unit arrives at a destination, and wherein the abnormality determination processing step includes determining that the communication state in said network is abnormal when the communication data reception state is abnormal or the communication data does not arrive at the destination, upon reception of the monitor processing result.

9. The network abnormality monitor method as claimed in claim 8, wherein the monitor processing step includes assuming that the communication data transmitted by its own station unit does not arrive at the destination when communication data indicating reception of the communication data is not returned from the destination of the communication data transmitted by its own station unit.

10. A network abnormality monitor system in a network comprising a plurality of station units connected by a ring-like main data transmission line enabling circular transmission of communication data in digital form and adopting a master slave method as a communication method, wherein said plurality of station units comprises one master station unit operating as a master and slave station units operating as slaves, wherein said network comprises at least one sub data transmission line being provided separately from the main data transmission line for connecting said station units, and wherein each of said station units comprises:
monitor means for executing monitor processing of monitoring a communication state in said network;
abnormality determination means for executing abnormality determination processing of determining whether or not the communication state in said network is abnormal upon reception of a monitor processing result of said monitor means; and
abnormality occurrence notification means for executing abnormality occurrence notification processing of sending abnormality occurrence information indicating abnormality occurrence and an abnormality occurrence point to said master station unit through the sub data transmission line when it is determined that the communication state in said network is abnormal as a result of the abnormality determination processing of said abnormality determination means.

11. A network abnormality monitor system in a network comprising a plurality of station units connected by a ring-like data transmission line enabling circular transmission of communication data in digital form and adopting a master slave method as a communication method,
wherein said plurality of station units comprises one master station unit operating as a master and slave station units operating as slaves,
wherein said network comprises at least one sub data transmission line being provided separately from the data transmission line for connecting said matter station unit and said slave station units in a one-to-one correspondence, and
wherein each of said station units comprises:
monitor means for executing monitor processing of monitoring a communication state in said network;
abnormality determination means for executing abnormality determination processing of determining whether or not the communication state in said network is abnormal upon reception of a monitor processing result of said monitor means; and
abnormality occurrence notification means for executing abnormality occurrence notification processing of sending abnormality occurrence information indicating abnormality occurrence and an abnormality occurrence point to said master station unit through the sub data transmission line when it is determined that the communication state in said network is abnormal as a result of the abnormality determination processing of said abnormality determination means.

12. The network abnormality monitor system as claimed in claim 10 or 11, wherein the sub data transmission line is an information transmission medium of a low transmission capacity as compared with the main data transmission line.

13. The network abnormality monitor system as claimed in claim 12, wherein the information transmission medium is a wake-up signal line which connects said master station unit to each of said slave station units in a one-to-one correspondence and is used when a wake-up signal as a network initialization command of each slave station unit is transmitted from the master station unit to each slave station unit.

14. The network abnormality monitor system as claimed in claim 12, wherein the information transmission medium in a power line used to supply power to each station unit.

15. The network abnormality monitor system as claimed in claim 12, wherein the information transmission medium as an analog signal line which connects said station units to each other and is used when analog communication data is exchanged between each of said station units.

16. The network abnormality monitor system as claimed in claim 12, wherein the information transmission medium is an analog signal line which connects said master station unit to each of said slave station units in a one-to-one correspondence and is used when analog communication data is exchanged between said master station unit and each of said slave station units.

17. The network abnormality monitor system as claimed in claim 10 or 11, wherein the monitor processing of said monitor means includes determining whether or not a reception state of communication data received from any other station unit than its own station unit is abnormal or whether or not communication data transmitted by its own station unit arrives at a destination, and wherein the abnormality determination processing of said abnormality determination means includes determining that the communication state in said network is abnormal when the communication data reception state is abnormal or the communication data does not arrive at the destination, upon reception of the monitor processing result of said monitor means.

18. The network abnormality monitor system as claimed in claim 17, wherein the monitor processing of said monitor means includes assuming that the communication data transmitted by its own station unit does not arrive at the destination when communication data indicating reception of the communication data is not returned from the destination of the communication data transmitted by its own station unit.

* * * * *

UNITED STATES PATENT AND TRADEMARK OFFICE
CERTIFICATE OF CORRECTION

PATENT NO. : 6,154,859
APPLICATION NO. : 09/059593
DATED : November 28, 2000
INVENTOR(S) : Norizuki et al.

It is certified that error appears in the above-identified patent and that said Letters Patent is hereby corrected as shown below:

In Claim 2 Col. 15, renumber Claim 2 as Claim 3, and at line 2 insert --or 2-- after "1";
In Claim 3 Col. 15, renumber Claim 3 as Claim 4, and at line 2 replace "2" with --3--;
In Claim 4 Col. 15, renumber Claim 4 as Claim 5, and at line 2 replace "2" with --3--;
In Claim 5 Col. 15, renumber Claim 5 as Claim 6, and at line 2 replace "2" with --3--;
In Claim 6 Col. 16, renumber Claim 6 as Claim 7, and at line 2 replace "2" with --3--;
In Claim 7 Col. 16, renumber Claim 7 as Claim 2;
In Claim 8, line 2, replace "7" with --2--;
In Claim 11, line 11, replace "matter" with --master--;
In Claim 14, line 3, replace "in" with --is--; and
In Claim 15, line 3, replace "as" with --is--.

Signed and Sealed this

First Day of April, 2008

JON W. DUDAS
*Director of the United States Patent and Trademark Office*